Figure 1:
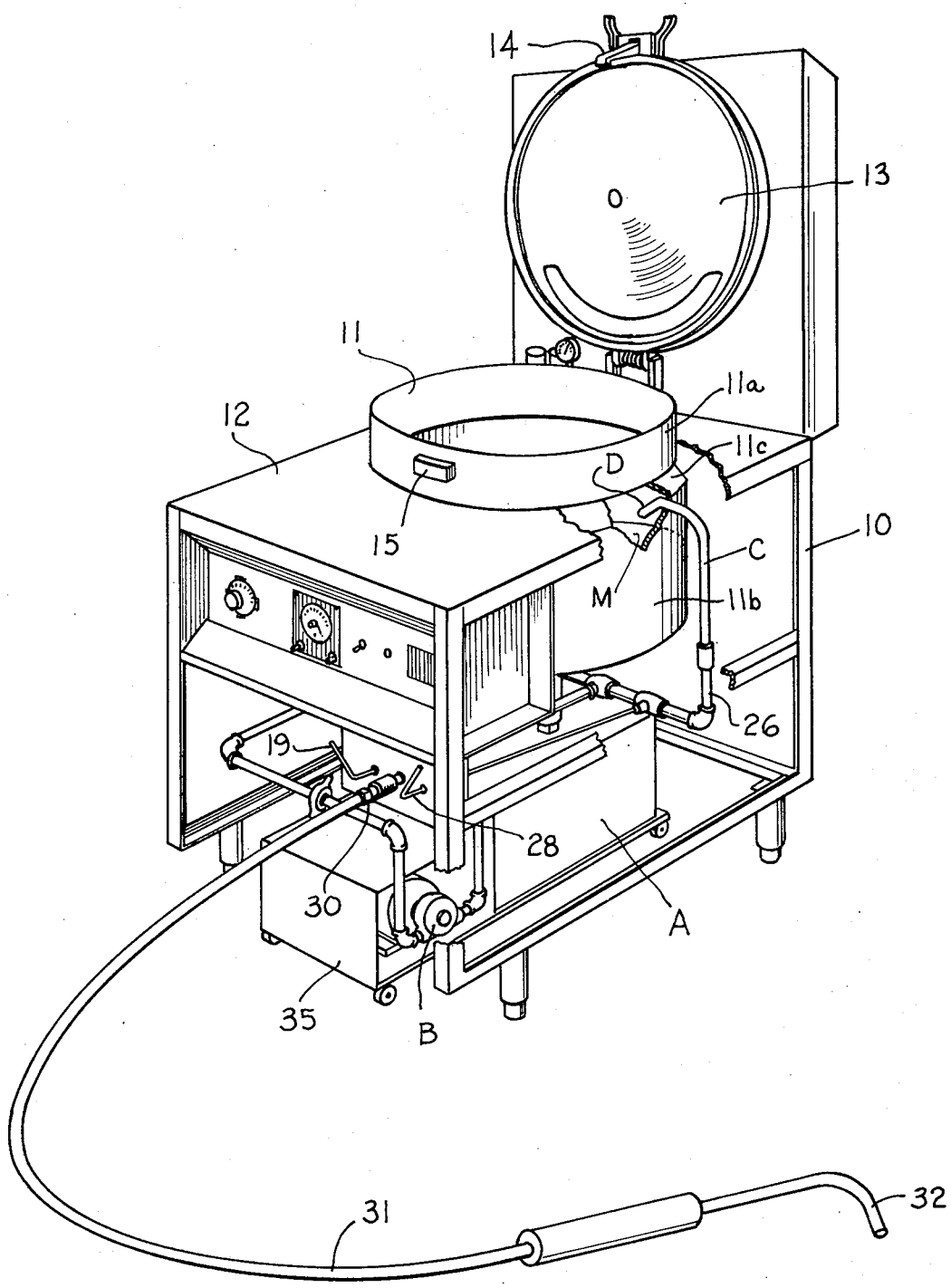

United States Patent [19]

Wilson et al.

[11] 3,707,907
[45] Jan. 2, 1973

[54] CLEANING DEVICE FOR DEEP FAT COOKER

[76] Inventors: Robert G. Wilson, 165 Faris Circle; Raymond W. Rogers, 414 Potomac Ave., both of Greenville, S.C. 29605

[22] Filed: April 26, 1971

[21] Appl. No.: 137,225

[52] U.S. Cl..............................99/408, 210/DIG. 8
[51] Int. Cl..............................................A47j 37/12
[58] Field of Search.....................99/408, 403–407; 210/DIG. 8

[56] References Cited

UNITED STATES PATENTS 3,210,193  10/1965  Martin.............................99/408 X
3,573,861   4/1971  Lecrone...........................99/408 X Primary Examiner—Leon G. Machlin
Attorney—Bailey and Dority

[57] ABSTRACT

Means for filtering the liquid cooking medium and for cleaning the pot of a deep fat pressure cooker include means for pumping filtered cooking medium from the filter means and returning the filtered cooking medium under pressure to the pot with spray means within the pot directing the filtered cooking medium under pressure in a stream across the inner surface of the pot, washing cooked food particles impinging thereon away for further filtering.

2 Claims, 3 Drawing Figures

INVENTOR.
ROBERT G. WILSON &
BY RAYMOND W. ROGERS
Bailey & Dority
ATTORNEYS.

3,707,907

CLEANING DEVICE FOR DEEP FAT COOKER

This invention relates to a filtering and cleaning means for use with a deef fat fryer and the like, wherein filtered cooking medium is sprayed under pressure about the interior walls of the pot for washing away cooked food particles.

On some deep fat pressure cookers presently on the market liquid cooking medium is discharged through the bottom of the pot into a filtering system from which it is pumped back into the pot through the same opening in the bottom of the pot through which it was first discharged. Other systems simply employ a filter from which the filtered liquid cooking medium is returned by pumping same to the pot, such as that illustrated in U.S. Letters Pat. No. Re. 26,672, issued Sept. 30, 1969, of which this is an improvement. None of these systems make provision for using the cooking medium to wash cooked food particles out of the pot. Further cooking of these food particles is injurious to the flavor of edibles cooked in the cooking medium containing them.

Accordingly it is an important object of this invention to thoroughly clean the liquid cooking medium which is to be employed in the deep fat frying of edibles especially, in a pressure cooker.

Another important object of the invention is the removal of food particles from the pot of a deep fat cooker using liquid cooking medium for this purpose.

Still another important object of this invention is to preserve the cooking qualities of liquid cooking medium employed in deep fat cooking thereby improving the flavor of edibles cooked therein so that the liquid cooking medium may be used repeatedly for an extended period of time.

The construction designed to carry out the invention will be hereinafter described, together with other features thereof.

Figure 2:
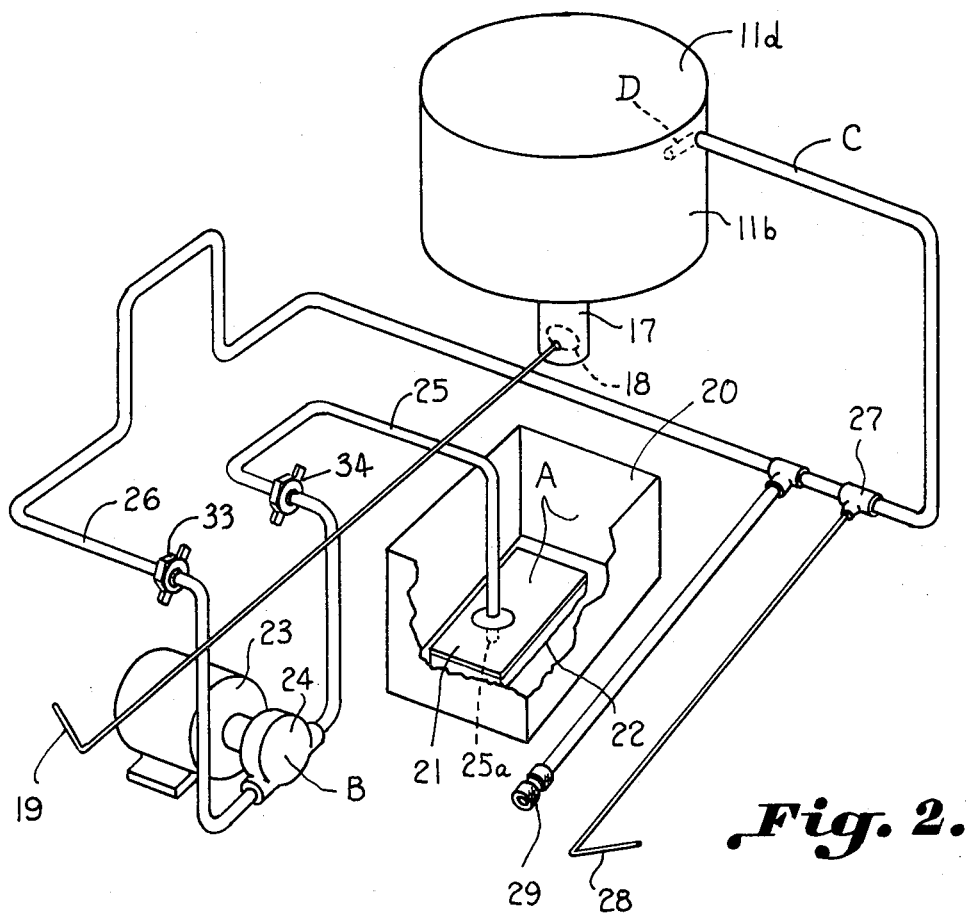
Figure 3:
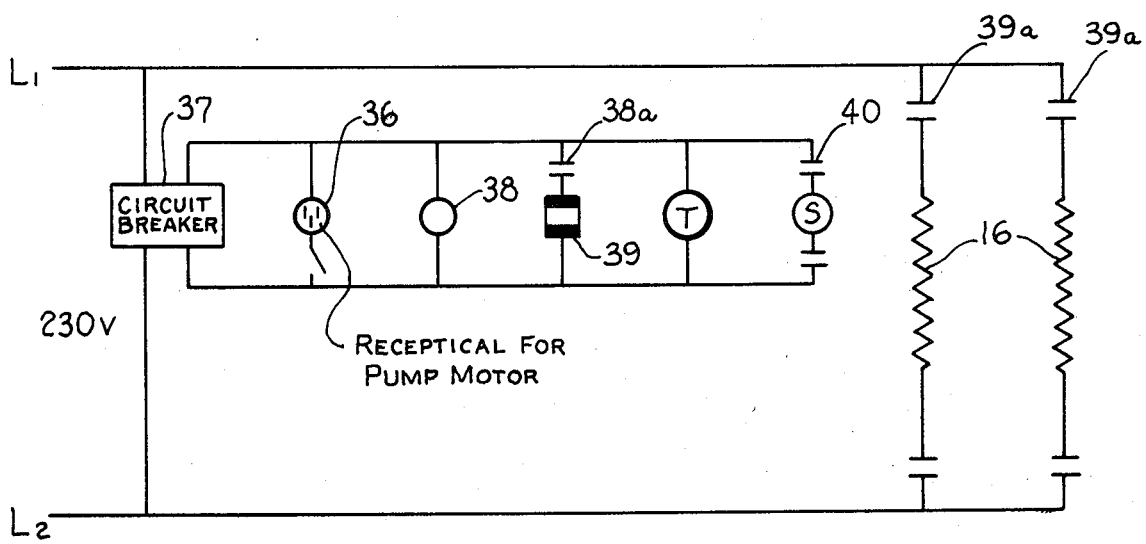

The invention will be more readily understood from a reading of the following specification and by reference to the accompanying drawings forming a part thereof, wherein an example of the invention is shown and wherein:

FIG. 1 is a perspective view illustrating a deep fat pressure cooker embodying the present invention, FIG. 2 is a schematic hydraulic diagram illustrating the various hydraulic components of the device illustrated in FIG. 1, and FIG. 3 is a schematic electrical diagram illustrating some of the electrical components employed in the cooker of FIG. 1.

The drawings illustrate a deep fat fryer and the like, containing a liquid cooking medium M within a pot, the pot having a vertical wall and a passageway adjacent a bottom with valve means for opening and closing the passageway. Electrical means is provided for heating the liquid cooking medium within the pot. Means for filtering the liquid cooking medium and for cleaning the pot include filter means A for receiving the liquid cooking medium from the passageway when the valve means is opened. Means B for pumping filtered cooking medium from the filter means are connected to means C returning the filtered cooking medium under pressure to said pot. Spray means D is connected to the means returning the filtered cooking medium within the pot directing the filtered cooking medium under pressure in a stream across an inner surface of the wall washing cooked food particles impinging thereon into the passageway for further filtering of such cooking medium.

The deep fat fryer illustrated herein is generally very similar to the deep fat pressure cooker described in the aforesaid patent so that some of the parts have been omitted herein, and a detailed description of certain of the parts shown will be omitted for purposes of clarity in describing the subject matter of the present invention. The deep fat pressure cooker includes a rectangular housing 10 which carries a vessel or pot 11 in an upper surface 12 thereof. The vessel is provided with a hinged cover 13 which has latching means 14 for securing the cover or lid 13 over the top of the pot by engaging a lug 15 carried adjacent the top of the pot. It should be observed that the pot 11 has a rim 11a carried at the top thereof, and a lower portion of 11b of enlarged diameter. An inwardly extending lip 11c joins the rim 11a and the enlarged bottom portion 11b. Electrical heating means in the form of coils illustrated schematically at 16 in FIG. 3, are positioned in the lower portion 11b of the pot. The pot has an open passageway 17 in the lower portion thereof through which liquid cleaning medium is discharged by gravity into the filter means A when the valve 18 is in open position as a result of turning the handle 19.

The filter means A includes an open topped receptacle 20 together with a filter medium 21 carried in space relation to the bottom of the receptacle 20 as by a suitable peripheral support 22.

Means B for pumping filtered cooking medium from the filter means includes a motor 23 which drives a pump 24 for pumping liquid cooking medium through the line 25 from the filter means A. The line 25 has a portion 25a which extends beneath the filter medium 21. It will be noted that the peripheral support 22 may be imperforate to assure that all of the liquid cooking medium picked up through the line 25 has been filtered. The filtered cooking medium is returned through the line 26 under pressure generated by the pump to the pot. Spray means C includes a portion of the line 26 which is bent at right angles to spray liquid cooking medium tangentially to the inner wall 11d of the pot. The means returning the filtered cooking medium includes the line 26 into which is interposed valve 27 for initiating the flow through the spray means D when the handle 28 is turned to open the valve. The means for concentrating a spray in the form of a nozzle-like member D is connected to the means returning the cooking medium and discharges same in a tangential path directly to an inner surface of the pot under pressure in a stream washing away cooked food particles impinging thereon, into the passageway 17 for further filtering of the liquid cooking medium.

The drawings also illustrate the female portion 29 of a quick connect coupling which is interposed in the line 26. The male portion of the coupling is illustrated at 30 in FIG. 1 and serves to connect the line 31 which carries a nozzle 32 to the pump when the valve 27 is closed. It is thus possible to manually spray the filtered cooking medium into the pot for the purpose of washing away the cooked food particles. It will also be observed that disconnect means are provided at 33 and 34 in the lines 26 and 25, respectively, so that the motor and pump, as well as the filter means A may be removed for cleaning purposes. These last mentioned elements are carried on a wheeled chassis 35 for convenience in operation.

FIG. 3 illustrates a 230 volt 2, while one phase system employing lines L1 and L2 across which various electrical components are connected. A receptacle for the pump motor 23 is illustrated at 36 and is connected across the line through the circuit breaker 37. A thermostat having its bulb (not shown) in the pot is illustrated at 38 and its contacts 38a operate a relay 39 for controlling relay contacts 39a for controlling the heating elements 16. A timer T has contacts 40 which control a solenoid S for relieving the pressure within the pot upon completion of a cooking cycle through mechanism not shown.

It is thus observed that the spray means D employs filtered cooking medium for washing the pot by discharging same tangentially to the inner surface of the pot. The pot has an inwardly extending lip which confines and directs the stream of liquid cleaning medium thus discharged to the lower portion of the pot so as to confine the stream within the pot. The rim or upper surface carried by the inwardly extending lip serves in connection to seal the cover so as to seal the contents of the pot making possible a build-up in pressure therein during cooking.

While a preferred embodiment of the invention has been described using specific terms, such description is for illustrative purposes only, and it is to be understood that changes and variations may be made without departing from the spirit or scope of the following claims.

What is claimed is:

1. A deep fat fryer and the like containing a liquid cooking medium within a pot, said pot having a vertical wall and a passageway adjacent a bottom, and electrical means for heating said liquid cooking medium, means for filtering said liquid cooking medium and for cleaning said pot comprising: filter means for receiving said liquid cooking medium for filtering same; means for pumping cooking medium from said pot; means for returning filtered cooking medium under pressure to said pot; and means for concentrating a spray connected to said means returning said filtered cooking medium within said pot of said filtered cooking medium under pressure directly in a stream across an inner surface of said wall adjacent an upper portion thereof washing cooked food particles impinging on all inner wall surfaces of said pot carrying cooked food particles into the passageway for further filtering of such cooking medium prior to again supplying said pot with filtered cooking medium.

2. The structure set forth in claim 1, wherein said vertical wall is round and has an inwardly extending lip carried by an upper portion thereof, means fixing the spray means below said lip confining said stream within the pot.

* * * * *